Aug. 20, 1940.  C. E. MORLEY  2,212,033
MOUNTING FOR REAR VIEW MIRRORS
Filed May 17, 1939
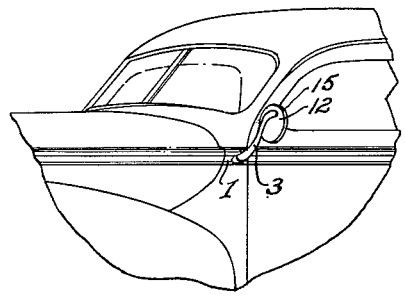
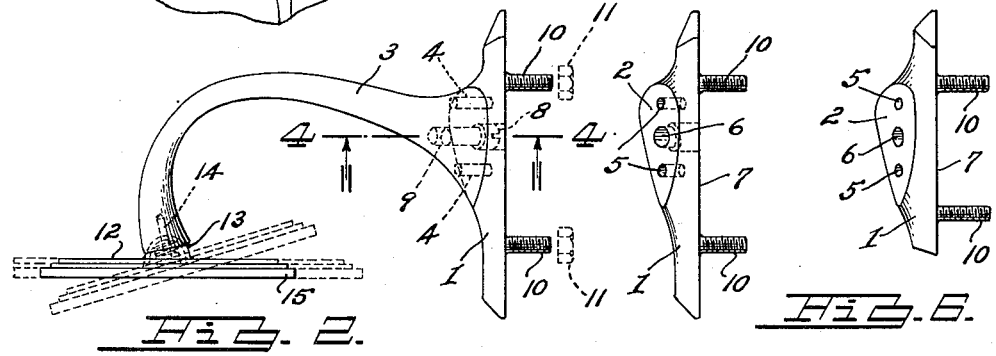
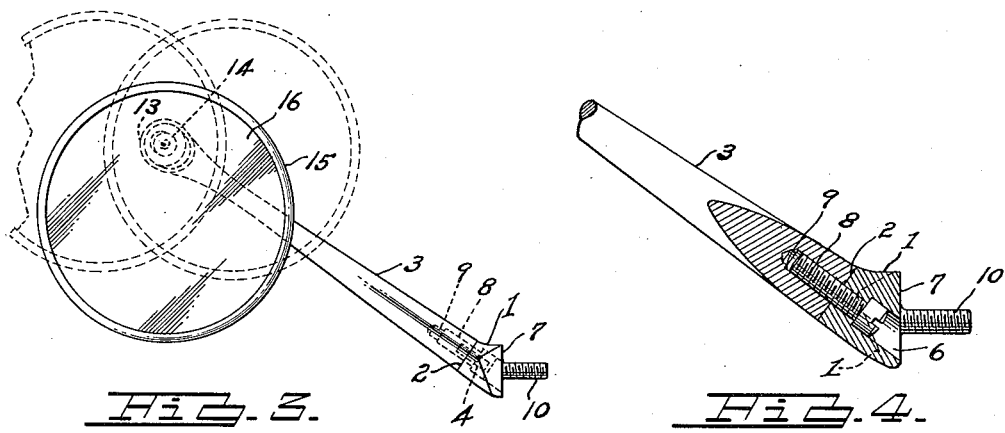
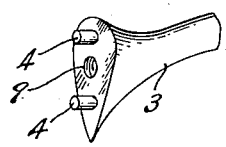
INVENTOR.
Charles E. Morley
BY
ATTORNEY.

Patented Aug. 20, 1940

2,212,033

UNITED STATES PATENT OFFICE 2,212,033

MOUNTING FOR REAR VIEW MIRRORS

Charles E. Morley, Detroit, Mich.

Application May 17, 1939, Serial No. 274,291

2 Claims. (Cl. 248—203)

This invention relates to rear view mirrors. An important object of the invention is to provide a rear view mirror having improved supporting means for mounting the same upon the exterior of an automobile body, arranged to absolutely prevent theft of the mirror when the car doors are locked.

One of the particular objects of the invention is, also, to provide a rear view mirror having a base formed to replace a section of the garnish molding on the exterior of the automobile body between the door and the hood, and having a support arm attached to the base by a screw which is inaccessible when the base is mounted in position on the automobile body, thus preventing theft of the mirror.

Another object of the invention is to provide a base attached to the mirror support arm from the inner side of the base and the base being provided with studs extending through the body apertures left by removal of the garnish molding, and having nuts on the inner side so that the mirror cannot be removed except by removing the nuts after access is had to the interior of the automobile.

A further object of the invention is to provide a base for the mirror formed to replace the section of garnish molding between the front door and hood of the automobile and to provide a continuation of the garnish molding so that the mirror support blends into the design of the automobile.

These objects and the several novel features of the invention are hereinafter more fully described and claimed and the preferred form of construction by which these objects are attained is shown in the accompanying drawing in which—

Fig. 1 is a perspective view of the forward end of an automobile showing one of my improved rear view mirrors mounted thereon.

Fig. 2 is a plan view of the mirror removed from the body.

Fig. 3 is an elevation thereof.

Fig. 4 is an enlarged section taken on line 4—4 of Fig. 2.

Fig. 5 is a plan view of the base for the mirror support.

Fig. 6 is a plan view of a slightly different form of base.

Fig. 7 is a detail of the support arm.

In the mounting of rear view mirrors of this type, it has been common practice to provide means for attachment to the door hinges, or to the edges of the doors of automobiles, in order to position the mirror properly to give the desired rear view. In most of these types it is a fairly easy matter to steal the entire rear view mirror and accessory thieves have to a certain extent specialized on the theft of these devices from parked automobiles. One of the particular objects of this invention is to provide a rear view mirror which cannot be stolen except by actually breaking into the automobile and removing the nuts from the studs on the inside of the automobile, a process which ordinarily requires too much time and too much danger for the thief to be interested. In my invention, I have sought to prevent the possibility of stealing the mirror from the support arm, or removing the support arm from the base, or removing the base from the automobile to which it is attached, and have found that the most practical point for attachment of the rear view mirror to the automobile is where the short strip of garnish molding is attached to the cowl of the car, between the hood and the front door. This strip of garnish molding is usually attached by providing a pair of studs on the garnish molding which are inserted through apertures in the cowl to secure the garnish molding in place.

My preferred mirror mounting incorporates a die cast base, 1, shaped to replace the side of the short strip of garnish molding which is customarily provided on the cowl between the door and the hood. The base is finished to conform to the continuing portions of the garnish molding on the hood and door and as shown in Fig. 5, is formed to provide an angular flat outer face 2.

A pair of studs 10 extend from the inner face of the base, spaced conformably to the spacing of the apertures provided in the car body for fastening the garnish molding. The spacing of these apertures is usually standardized on each automobile model, and as they open interiorly behind the instrument panel, in most cases, it is not even necessary to loosen a panel, when installing the mirror, to allow the nuts 11, shown in dotted lines in Fig. 2, to be threaded onto the studs.

The mirror supporting arm 3 is shaped at its inner end to fit the face 2 of the base and is provided with a pair of pins 4 adapted to fit in recesses 5 provided in the face of the base. An aperture 6 also extends through the base between the pin sockets, to accommodate a screw 8 adapted to be inserted through this aperture from the concealed face of the base in such manner as to extend into a threaded aperture 9 provided therefor in the end of the support arm 3, as shown in Figs. 2, 3, 4 and 7. By this arrangement, the support arm is firmly secured to the base 1 and the head of the screw 8 is only accessible through the aperture 6 opening on the inner face of the base.

When the mirror is installed and the nuts 11 have been turned up tight, therefore it is impossible to remove either the base or the arm from the exterior of the automobile, and when the car doors are locked it would be necessary for a thief to break the car open to get into the interior of the car and remove the nuts 11 to allow theft of the rear view mirror.

The sheet metal back 12 for the mirror is provided with a hollow protruding boss 13 through which the attaching screw 14 extends, and after the back has been assembled upon the arm, as shown in dotted lines in Fig. 2, the edge 15 is turned over the mirror 16, as shown in Fig. 3, to prevent removal of the glass. The boss is rotatable and rockable in a partly spherical socket in the end of the arm, to permit the mirror to be adjusted on the outer end of the support arm 3 as shown in dotted lines in Figs. 2 and 3. Thus, the connection between the mirror itself and the arm 3 is inaccessible except by breaking the glass, which would ruin the part the thief was trying to steal. By making the base 1 as a continuation of the garnish molding and providing it with the same finish a very pleasing appearance is achieved as the mirror support arm 3 forms a smooth curving extension of the garnish molding.

In Fig. 6 I have shown a slightly different form of base member, which is shorter than that shown in Fig. 5. Such variation in the proportions of base members is required due to the fact that in different automobiles the distances between the front edge of the front door and the rear edge of the hood vary. By means of the screw 8, different bases may be attached to the same supporting arm, to enable the mirror to be accommodated to any particular model of automobile.

It will be apparent that the device is very neat and pleasing in appearance when attached to the automobile, cannot be removed except by access to the interior of the automobile, allows adjustment of the mirror on the support arm to any desired position and provides a device which accomplishes the objects described.

Having thus fully described my invention, its utility and mode of operation, what I claim and desire to secure by Letters Patent of the United States is—

1. A mounting for a rear view mirror on an automobile body comprising a base plate formed to replace the section of garnish molding between the door and hood of the automobile, the base plate being built up to provide a portion having an angular flat face provided with a pair of recesses, a mirror supporting arm fitting against said flat face and provided with pins fitting in the recesses, the lines of the support arm and the built up portion when assembled forming continuous curves, the base being provided with an aperture opening through said flat face, a screw extending from the inside of the base through said aperture into the support arm to secure the same together and a pair of studs extending from the base on the side opposite the support arm, said studs being arranged for insertion through apertures in the automobile body, nuts threaded on the ends of said studs on the interior of the automobile body to secure the device thereto, the screw attaching the support arm to the base being inaccessible when so mounted.

2. In a mounting for securing a rear view mirror upon an automobile, a base member formed to replace the section of garnish molding between the door and the hood of the automobile and having an inner face adapted to bear against the automobile body and a pair of studs projecting from said face and arranged to be inserted through the automobile body and secured from the inside of said body, said base member also having an outer face and an aperture extending through said member and opening in said outer face at one end, and in said inner face at its other end, a mirror supporting arm shaped to fit said outer face, fastening means extending through the aperture in the base and releasably securing the supporting arm to the base, cooperating keying means carried partly by the supporting arm and partly by the base to prevent unwanted turning of one with relation to the other, the arrangement being such that when the base is secured to the automobile body said fastening means is inaccessible.

CHARLES E. MORLEY.